Jan. 21, 1936.     F. W. FLEGEL     2,028,595
DRINK MILL
Filed April 30, 1934
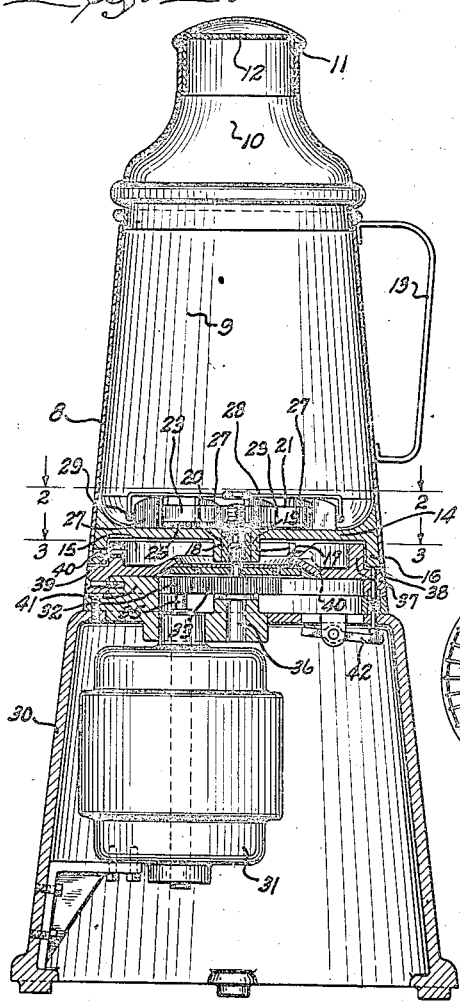
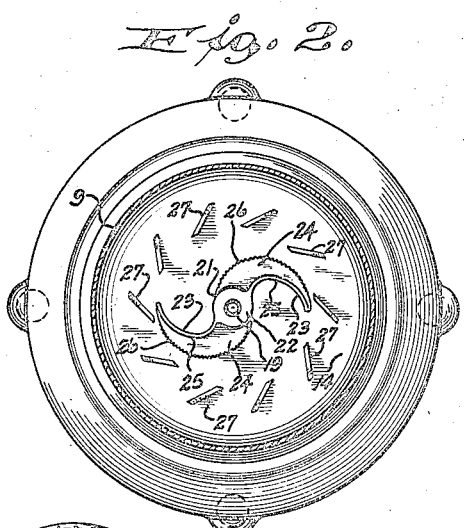
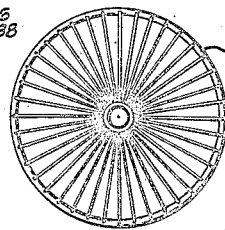
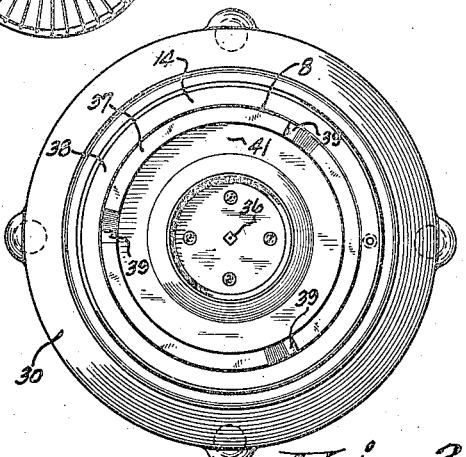
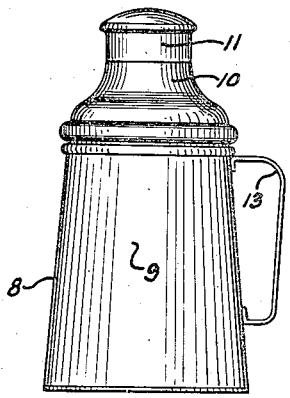
INVENTOR.
Frederick W. Flegel,
BY Morsell, Lieber & Morsell
ATTORNEYS.

Patented Jan. 21, 1936

2,028,595

UNITED STATES PATENT OFFICE 2,028,595

DRINK MILL

Frederick W. Flegel, Racine, Wis.

Application April 30, 1934, Serial No. 723,219

4 Claims. (Cl. 259—108)

The present invention relates in general to improvements in the art of mixing fluent substances and relates more specifically to an improved apparatus for disintegrating, milling, mixing, and aerating materials to produce palatable and beneficial drinks or the like.

It is a relatively simple matter to stir or otherwise agitate several liquids in order to produce an ordinary mixture, but when it is attempted to mix pulpy or fibrous materials with a liquid to produce a mechanical mixture, the problem becomes far more difficult. While the drink mixers heretofore utilized are capable of producing a mixture of ordinary liquids, they cannot be effectively utilized to produce a suitable mixture of ingredients such as fresh fruits and vegetables, with each other or with fluent materials, such as finely divided powder and liquid, in order to create a uniform and creamy fluent mixture. These prior commercial drink mixers are not adapted to properly disintegrate solid constituents having a pulpy or fibrous structure, and they are furthermore unable to properly aerate a thick or semi-fluent mixture of materials. Furthermore, the prior devices of this character are slow in operation and are relatively unsanitary.

It is an object of the present invention to provide a simple and highly efficient apparatus for milling, mixing, and aerating various solid and fluent substances to produce a homogeneous and creamy mixture.

A more specific object of the invention is to provide an improved apparatus for milling and mixing drinks and beverages from assorted initial ingredients of either solid or liquid character, or both, which apparatus obviates all of the defects of the prior drink mixers and greatly increases the range of usefulness of devices of this kind.

A further specific object of the invention is to provide a drink mill which occupies a minimum amount of space, which is highly attractive and original in appearance, and which is conveniently operated and handled by an individual.

Still another specific object of the invention is to provide a drink mill which eliminates waste of material and which may be readily cleaned and washed, so as to maintain it in a highly sanitary condition at all times.

A further specific object of the invention is to provide a drink mill which is susceptible of mixing and comminuting solid materials and which will greatly lessen the mixing period by driving comminuted particles of material against and thru a series of lower fins and then creating currents of material which pass upwardly along the sides of the container and then downwardly centrally of the container to displace the material in the bottom of the mill.

A further object of the invention is to provide a drink mill in which the drink to be concocted may be flushed and cooled by being passed thru ice, the arrangement being such that the moving mechanism is protected against direct contact with the ice lumps utilized.

A further specific object of the invention is to provide a drink mill wherein the agitator driving shaft extends thru a bushing for connection with propelling mechanism, and a portion of said driving shaft, within the bushing, is wrapped with fibrous material or packing to prevent leakage thru the bushing by virtue of centrifugal force.

A further specific object of the invention is to provide a drink mixing container wherein the container per se is opposite in shape from the shape of the conventional container, in that the present container is wide at its lower portion and tapers inwardly toward its upper portion, whereby the mixed material, being driven up the sides of the container toward the upper portion of lesser diameter, will be folded or directed toward the axial portion of the top of the container and thence axially downwardly.

Still another specific object of the invention is to provide a drink mill arranged so that the container may be easily and rigidly seated on and connected with the base of the housing for the motive power.

These and other objects and advantages will be apparent from the following detailed description.

A clear conception of embodiments of the several features constituting the present invention, and of the mode of constructing and operating drink mills built in accordance with the improvement, may be had by referring to the drawing accompanying and forming a part of this specification and in which like reference characters designate the same or similar parts in the various views.

Fig. 1 is a central, vertical, sectional view thru the improved drink mill and the motive supplying member on which it is mounted;

Fig. 2 is a horizontal, sectional view, taken on line 2—2 of Fig. 1;

Fig. 3 is another horizontal, sectional view, taken on line 3—3 of Fig. 1;

Fig. 4 is a plan view of the removable screen, which may be placed over the agitator and baffles of the mill; and Fig. 5 is a view of the drink mill per se on a smaller scale.

Altho the invention will be described and shown herein as being specifically embodied in a drink mill especially adapted for soda fountain, bar, and restaurant service, it should be understood that some of the features are more generally applicable and that it is not intended to unnecessarily limit the scope of the invention by virtue of this specific embodiment.

Referring now more particularly to the drawing, it will appear that the drink mill includes a container, indicated generally by the numeral 8. Said container comprises a main receptacle portion 9, a neck portion 10 removably mounted on the upper end thereof, and a cap 11 removably closing the perforated pouring end 12 of said neck portion. The main receptacle portion is preferably provided with a laterally extending handle 13.

The container 8 is of circular form in cross-section and of largest diameter at its lower portion with gradually decreasing diameter toward the top thereof, whereby the container walls are upwardly inwardly inclined. The lower end portion of the container is closed by a bottom member 14 having its lower surface upwardly recessed, as at 15, to provide the container with a lower, annular skirt or flange 16. Also, the bottom is formed centrally with a depending bored boss 17 having mounted therein a bearing sleeve 18 in which is rotatably mounted an agitator shaft 19. Within said sleeve a reduced portion of said shaft has packing 20 wrapped thereabout, so as to prevent liquid leakage between the sleeve 18 and shaft 19. The upper face of the bottom member 14, within the receptacle, is dished, so as to direct liquid toward the inner side walls of the receptacle.

To act as the impelling force in the mixing and comminuting of materials, an agitator 21 is provided. Said agitator is formed with a central hub portion 22 into which the upper end of the agitator shaft 19 extends and is fast thereto. Extending outwardly from the hub portion 22 of the agitator are two or more fins 23. The fins are curved, as in Fig. 2, and each fin is of right angular form in vertical section with a horizontal portion 24 and a vertical portion 25 extending from an edge of the horizontal portion. The outer edges of the fin portions 24 are serrated, as at 26. The agitator is mounted so that the under surfaces of the fin portions 24 just clear the bottom of the container, facilitating cleaning operations and leaving the entire upper interior portion of the container free from obstruction.

Positioned in spaced relation in a circle just outwardly of the outer extremities of the fins of the agitator are a series of baffles 27. Said baffles are affixed to and project vertically upwardly from the inner surface of the bottom member 14 of the container. All of the baffles are arranged obliquely to radii of the circle of baffles, and their inner edge portions may be beveled. To protect the agitator and baffles from being damaged by pieces of ice or the like, a removable screen element 28, shown in detail in Fig. 4, is provided. The screen element is formed with a depending annular wire flange 29 which frictionally engages outer portions of the baffles, as in Fig. 1, and by which means the screen element may be held in cap-like relation over the agitator and baffles.

The motive power instrumentality for the mixing mill may be built substantially similar to standard devices of this character. This includes a housing 30 enclosing a suitably supported electric motor 31. Thru a pair of gears 32 and 33, the motor shaft 35 drives a vertical shaft 36 extending centrally thru the top 41 of the housing 30. The top 41 of the housing is formed, inwardly of its periphery, with an upstanding annular collar 37, providing an annular ledge 38, of lower elevation, outwardly thereof.

When the container 8 is to be mounted on the motive power member and connected therewith for mixing purposes, said container is lowered onto the top portion of the motor housing so that the container skirt 16 encloses the housing collar 37 and ultimately seats on the annular ledge 38. It will be noted, however, that the collar 37 is formed with a plurality of inclined, upwardly opening notches 39, which are adapted to cooperate with pins or lugs 40 extending radially inwardly from the skirt of the container. The container should be turned so as to bring said pins into registration with the notches 39, and then, upon a further turn of the container, the pins ride into the lowest portions of the notches to seat the container in lowered position upon the top of the motor housing. During this movement, the upper end of the vertical shaft 36, which is squared, enters a squared opening in the agitator shaft 19 to effect a driving connection between said shafts. Proper seating of the container on the motor housing also serves to actuate a switch 42 to close the circuit to the motor 31 whereby the shafts are driven, thru which means the agitator 23 is rapidly turned within the lower portion of the container.

When the mill has been thus set into operation, mixing, disintegrating, and milling of the materials with which the container 8 has been charged will be commenced. The material utilized may include liquids, powdered material, fruits, etc.; and liquor concoctions may also be mixed. Due to rapid turning of the agitator, the agitator blades or fins quickly become effective to thoroly disintegrate and comminute the solid materials and to drive said materials against the baffles 27, which cooperate with the agitator in the disintegrating functions. The action of the agitator causes a plurality of outward and upward streams of materials against the lower inner wall portions of the container, whereupon the material travels upwardly along said enclosed walls toward the top of the container. At the upper portion of the container, the flow is inwardly toward the axis of the container, and then the stream of material is drawn centrally downwardly by the agitator. When the mixture includes solid materials which are to be disintegrated, the screen 28 is not utilized. However, the device may be used to mix and chill liquids or liquors and to flush said liquids thru pieces of ice. In this event, the screen is positioned as shown in Fig. 1, so as to protect the agitator and baffles from direct contact with pieces of ice disposed within the container.

The mixing and milling of drinks is accomplished extremely rapidly and upon completion of the operation, the container is grasped by the handle 13 and is removed from the housing 30 by a manipulation which is the reverse of that described in connection with the mounting of the container. The cap 11 may be removed and the contents of the container may be readily poured therefrom into glasses thru the perforated top 12.

It should be understood that it is not desired to limit the invention to the exact details of construction herein shown and described, for various modifications within the scope of the appended claims may occur to persons skilled in the art.

What is claimed as the invention is:

1. In a drink mill, a container having a closed lower end portion, a plurality of low disintegrating baffles rigidly mounted in spaced, circular formation within said closed end of the container and obliquely to radii of the container, an agitator revolubly mounted within said closed end of the container within the circle of baffles, the baffles being positioned so as to obstruct the normal direction of flow of material from the agitator, and a screen member removably engaging the baffles and completely covering and enclosing the baffles and agitator.

2. In a drink mill, an upwardly reduced receptacle, the lower enlarged end of the receptacle being closed, a plurality of adjacent spaced disintegrating baffles projecting upwardly from the bottom of the receptacle, and an agitator revoluble in the lower portion of the receptacle and adjacent inner edge portions of the baffles, the baffles being positioned so as to obstruct the normal direction of flow of material from the agitator, the faces of the baffles all being oblique to radii of the container, said agitator comprising a pair of curved blades of right angular form in cross-section, certain leading edges of the blades being serrated.

3. In a drink mill, a motor having an upwardly projecting drive shaft, a base supporting said motor, a flanged support carried by said base and surrounding a projecting portion of said drive shaft, said flange being provided with three spaced-apart recesses with an inclined guide surface leading to each recess, a receptacle cooperable with said support and having a closed lower end with an annular skirt depending therefrom, an agitator within the receptacle and having a shaft extending centrally through the receptacle closed lower end, and three spaced-apart pins projecting inwardly from the skirt of the receptacle and adapted to ride on said inclined guide surfaces to seat or unseat the receptacle when the receptacle is rotated relative to the base, seating of said receptacle relative to the base with said pins within said recesses serving to secure said members together and insuring axial alinement and engagement between the agitator shaft and the drive shaft.

4. In a drink mill, a container having a closed lower end portion, a plurality of relatively closely adjacent, rectilineal disintegrating baffles rigidly and permanently mounted within the container adjacent the lower end portion thereof and in spaced circular formation obliquely to radii of the container, and an agitator revolubly mounted within said closed end of the container within the circle of baffles, the baffles being positioned so as to obstruct the normal direction of flow of material from the agitator and being low relative to the depth of the container, the leading edges of the agitator blades being angled relative to the radii of the container in the same direction of extent as the faces of the baffles.

FREDERICK W. FLEGEL.